US008265286B2

(12) United States Patent
Segel et al.

(10) Patent No.: US 8,265,286 B2
(45) Date of Patent: Sep. 11, 2012

(54) PROCESSING SIGNALS REPRESENTATIVE OF SOUND BASED ON THE IDENTITY OF AN INPUT ELEMENT

(75) Inventors: Philip A. Segel, Englewood, CO (US); Tissa Karunasiri, Castaic, CA (US); Lakshmi N. Mishra, Valencia, CA (US)

(73) Assignee: Advanced Bionics Corporation, Valencia, CA (US)

( * ) Notice: Subject to any disclaimer, the term of this patent is extended or adjusted under 35 U.S.C. 154(b) by 0 days.

(21) Appl. No.: 12/491,593

(22) Filed: Jun. 25, 2009

(65) Prior Publication Data

US 2009/0279723 A1 Nov. 12, 2009

Related U.S. Application Data

(62) Division of application No. 11/008,869, filed on Dec. 9, 2004, now Pat. No. 7,599,500.

(51) Int. Cl.

*H04R 29/00* (2006.01)
*H04R 25/00* (2006.01)
*G05B 13/02* (2006.01)
*G08B 21/00* (2006.01)

(52) U.S. Cl. ............. 381/58; 381/312; 700/30; 340/659

(58) Field of Classification Search .................... 381/58, 381/60, 312, 314, 331; 600/25; 607/56–57; 340/659, 825.24, 825.25; 700/9, 12, 28, 700/30, 83, 89

See application file for complete search history.

(56) References Cited

U.S. PATENT DOCUMENTS 4,793,353 A 12/1988 Borkan
5,202,927 A * 4/1993 Topholm ....................... 381/315
5,814,095 A 9/1998 Muller et al.
6,035,050 A * 3/2000 Weinfurtner et al. ......... 381/313
6,154,678 A 11/2000 Lauro
6,157,728 A 12/2000 Tong et al.
6,216,045 B1 4/2001 Black et al.
6,219,580 B1 4/2001 Faltys et al.
6,289,246 B1 9/2001 Money
6,289,247 B1 9/2001 Faltys et al.
6,724,900 B2 * 4/2004 Fujino ........................... 381/315
6,728,578 B1 4/2004 Voelkel (Continued)

FOREIGN PATENT DOCUMENTS

WO 2006/053101 5/2006

(Continued)

OTHER PUBLICATIONS

U.S. Appl. No. 11/089,171, filed Mar. 24, 2005, Hahn (Continued)

*Primary Examiner* — Jesse Elbin

(74) *Attorney, Agent, or Firm* — Wong, Cabelllo, Lutsch, Rutherford & Brucculeri LLP

(57) ABSTRACT

Systems and techniques for processing signals representative of sound for conveyance to the auditory system of a subject based on the identity of an input device. In one implementation, a method includes identifying an input element to an audiological system that conveys sound information directly to a subject's auditory system, automatically setting parameters for processing the signal based on the identity of the input element, and processing the signal in accordance with the processing parameters. The input element is configured to generate a signal representative of sound.

22 Claims, 8 Drawing Sheets

U.S. PATENT DOCUMENTS

| | | | |
|---|---|---|---|
| 7,200,504 | B1 | 4/2007 | Fister |
| 7,203,548 | B2 | 4/2007 | Whitehurst et al. |
| 7,242,985 | B1 | 7/2007 | Fridman et al. |
| 7,277,760 | B1 | 10/2007 | Litvak et al. |
| 7,292,890 | B2 | 11/2007 | Whitehurst et al. |
| 7,308,303 | B2 | 12/2007 | Whitehurst et al. |
| 7,450,994 | B1 | 11/2008 | Mishra et al. |
| 7,522,961 | B2 | 4/2009 | Fridman et al. |
| 2003/0036782 | A1 | 2/2003 | Hartley et al. |
| 2003/0059073 | A1* | 3/2003 | Bren et al. .................... 381/312 |
| 2003/0195582 | A1 | 10/2003 | Mann |
| 2004/0015204 | A1 | 1/2004 | Whitehurst et al. |
| 2004/0015205 | A1 | 1/2004 | Whitehurst et al. |
| 2004/0044383 | A1 | 3/2004 | Woods et al. |
| 2004/0082985 | A1 | 4/2004 | Faltys et al. |
| 2004/0114776 | A1 | 6/2004 | Crawford et al. |
| 2004/0116978 | A1 | 6/2004 | Bradley |
| 2004/0213424 | A1 | 10/2004 | Hamacher et al. |
| 2004/0247145 | A1 | 12/2004 | Luo et al. |
| 2005/0105750 | A1* | 5/2005 | Frohlich et al. ............... 381/314 |
| 2005/0137651 | A1 | 6/2005 | Litvak et al. |
| 2005/0207602 | A1 | 9/2005 | Van Oerle |
| 2006/0100672 | A1 | 5/2006 | Litvak |
| 2006/0229688 | A1 | 10/2006 | McClure et al. |
| 2007/0021800 | A1 | 1/2007 | Whitehurst et al. |
| 2007/0055308 | A1 | 3/2007 | Haller et al. |
| 2007/0123938 | A1 | 5/2007 | Haller et al. |
| 2007/0260292 | A1 | 11/2007 | Faltys et al. |

FOREIGN PATENT DOCUMENTS

| | | |
|---|---|---|
| WO | 2007/030496 | 3/2007 |

OTHER PUBLICATIONS

U.S. Appl. No. 11/122,648, filed May 5, 2005, Griffith.
U.S. Appl. No. 11/178,054, filed Jul. 8,2005, Faltys.
U.S. Appl. No. 11/226,777, filed Sep. 13, 2005, Faltys.
U.S. Appl. No. 11/261,432, filed Oct. 28, 2005, Mann.
U.S. Appl. No. 11/262,055, filed Oct. 28, 2005, Fridman.
U.S. Appl. No. 11/386,198, filed Mar. 21, 2006, Saoji.
U.S. Appl. No. 11/387,206, filed Mar. 23, 2006, Harrison.

* cited by examiner

PROCESSING SIGNALS REPRESENTATIVE OF SOUND BASED ON THE IDENTITY OF AN INPUT ELEMENT

CROSS-REFERENCE TO RELATED APPLICATION

This application is a divisional of U.S. patent application Ser. No. 11/008,869, filed Dec. 9, 2004, which is incorporated by reference and to which priority is claimed.

BACKGROUND

This disclosure relates to processing signals representative of sound for conveyance directly to the auditory system of a subject based on the identity of an input device.

Humans have traditionally perceived sound using the physiological auditory system. This perception of sound can now be supplemented by man-made audiological systems that convey sound information directly to a subject through components of the auditory system. Such audiological systems convey sound information directly to a subject's auditory system by stimulating the subject's auditory system without significant dissemination of sound waves into the surroundings. Audiological systems include hearing aids, cochlear implants, and other devices that include a microphone or other input element.

When such input elements are stimulated, they produce signals representative of sound. Such signals often are not immediately compatible with the auditory system and must be processed so that the sound information in the signal can be conveyed to the auditory system.

Such sound processing may include any of a number of different changes to the signal, including amplification, filtering, mixing, and encoding changes. The nature and extent of the changes can be based on factors such as the nature of the sound represented in the signal, the state of the auditory system, the nature of the interface between the auditory system and the audiological system, the characteristics of the input element, and the like.

SUMMARY

The inventors recognized that the processing of signals representative of sound for conveyance directly to the auditory system of a subject can be changed automatically (i.e., without human intervention) depending on the identity of an active sound input element. For example, in one implementation, a method includes identifying an input element to an audiological system that conveys sound information directly to a subject's auditory system, automatically setting parameters for processing a signal representative of sound based on the identity of the input element, and processing the signal in accordance with the set processing parameters. The input element is configured to generate the signal representative of sound. The method is implemented by a machine.

This and other implementations can include one or more of the following features. The input element can be identified by recognizing an electrical characteristic of the input device. For example, an electrical response of the input device can be sampled to recognize the electrical characteristic. The sample of the electrical response can be compared to a library of expected responses. As another example, at least one of a power-on transient, a power-off transient, a characteristic impedance of the input element, and a unique identifier of the input element can be recognized to recognize the electrical characteristic.

Processing the signal in accordance with the processing parameters can include mixing the signal with a second signal representative of sound. The second signal can be generated by a second input element to the audiological system. The input element can be uniquely identified or the input element can be identified as a member of a class of input elements. For example, the input element can be identified as an audio frequency induction loop receiver, as a low source impedance signal generator (such as a CD/MP3 player), or as a direct input, pressure-sensitive element (such as a microphone).

The method can also include conveying the processed signal directly to the subject's auditory system. Interchangeable input element can be identified. Input elements can be identified based on a response of the input element to one or more of a power-on event and a power-off event. The identification of the input element can be in response to a triggering event such as a prompt by a user. Processing the signal in accordance with the processing parameters can include processing the signal for direct electrical stimulation of a cochlea in the subject's auditory system.

In another implementation, an apparatus includes an audiological system configured to convey sound information to a subject's auditory system. The audiological system includes an input element configured to generate a signal representative of sound, a library of associations of processing parameters, and a selection processor configured to automatically select an association of processing parameters based on an identity of the input element. The associations of processing parameters each include processing parameters that are coordinated to improve processing of certain classes of signals representative of sound.

This and other implementations can include one or more of the following features. The library of associations can include a program category identifier that identifies certain associations in the library as belonging to a particular program category. The audiological system can include a user selection input configured to receive a user selection of a program category desired by a user or a second input element configured to generate a signal representative of sound.

The associations can be programs of processing parameters. The parameters can be coordinated to improve processing of signals representative of sound from certain classes of input devices. A first program can include processing parameters coordinated to improve processing of signals representative of sound from an audio frequency induction loop receiver, from a low source impedance signal generator, or from a direct input, pressure-sensitive element.

The audiological system can include a portion dimensioned to be borne by a subject. The borne portion can include a memory device that stores the library of associations. The audiological system can include a device configured to directly stimulate a subject's nerve cells, such as a subject's cochlear nerve cells.

In another implementation, an apparatus includes an audiological system configured to convey sound information to a subject's auditory system. The system includes a processor having inputs to receive a first signal representative of sound generated by a first input element and a second signal representative of sound generated by a second input element. The processor includes identification logic to identify at least one of the first input element and the second input element, setting logic to set processing parameters based on the identification by the identification logic, and signal processing logic to process at least one of the first signal and the second signal in accordance with the processing parameters.

This and other implementations can include one or more of the following features. The processor can include identification logic to identify a class of at least one of the first input element and the second input element. For example, the identification logic can compare a characteristic of the at least one of the first input element and the second input element with expected values from different classes of input elements.

The audiological system can also include a transient sampling device arranged to sample at least one of a power-on transient and a power-off transient and to provide the sample to the processor. The audiological system can include a device configured to directly stimulate a subject's nerve cells, such as a subject's cochlear nerve cells.

In another implementation, an audiological system can include an implanted portion and an unimplanted portion. The implanted portion can include a receiver configured to receive information, and electrodes arranged to convey the received information directly to nerve cells in a subject's auditory system. The unimplanted portion can include a first input element configured to generate a first signal representative of sound, a second input element configured to generate a second signal representative of sound, a processor configured to identify at least one of the first input element and the second input element and process at least one of the first signal and the second signal in accordance with the identification, and a transmitter configured to transmit the information to the receiver of the implanted portion, the transmitted information reflecting the processing by the processor.

These and other implementations can be implemented to realize one or more of the following advantages. The signature of an auxiliary input to the front end of a sound processor can be automatically sensed. The signature can be used to identify the class of accessory or input device connected to the processor, and signal processing can be adjusted in light of the identified class.

The details of one or more implementations are set forth in the accompanying drawings and the description below. Other features will be apparent from the description, the drawings, and the claims.

DESCRIPTION OF DRAWINGS

Like reference symbols in the various drawings indicate like elements.

DETAILED DESCRIPTION

Figure 1:
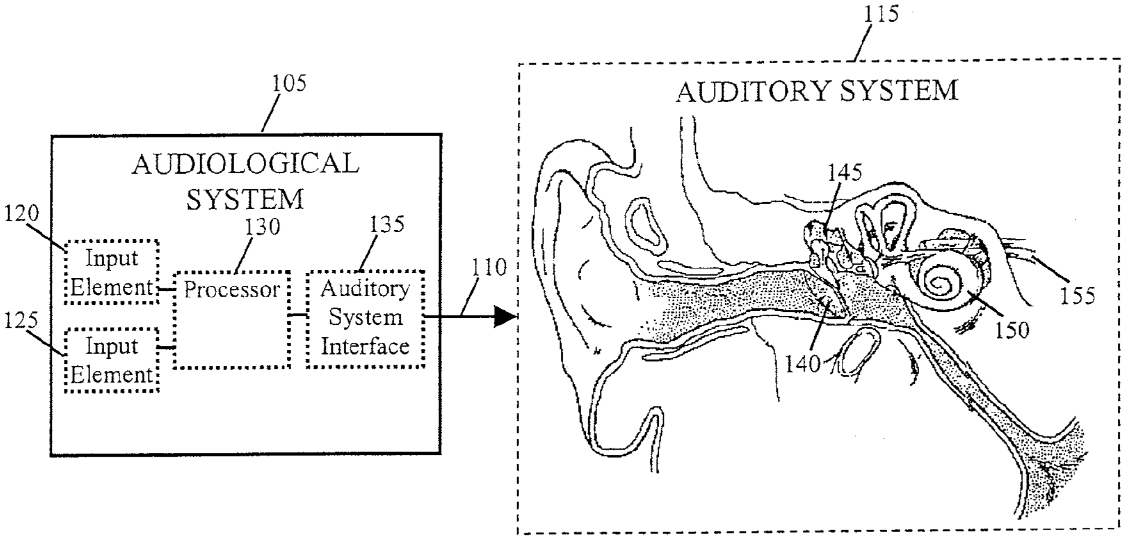
FIG. 1 shows a block diagram of an audiological system that conveys sound information directly to a subject's auditory system.

FIG. 1 shows an audiological system 105 that conveys sound information 110 directly to a subject's auditory system 115. Audiological system 105 includes input elements 120, 125, a processor 130, and an interface with the auditory system 135. Input elements 120, 125 are devices that generate signals representative of sound. Input elements 120, 125 can be direct input devices in that they transduce sound waves directly to generate a signal representative of sound (e.g., pressure-sensitive elements such as microphones). Input elements 120, 125 can alternatively be indirect input elements in that they respond to something other than sound waves to generate a signal representative of sound. For example, input elements 120, 125 can receive an audio component of a television or radio signal to generate a signal representative of sound. Thus, input elements 120, 125 can be, e.g., a compact disk player or an MP3 player or other player of stored or streaming digital data. Input elements 120, 125 output the signals representative of sound to processor 130.

Processor 130 receives signals representative of sound from input elements 120, 125. Processor 130 is a device that processes information. For example, processor 130 processes the signals generated by input elements 120, 125 for conveyance to the auditory system in accordance with logic embodied in hardware and/or software. Processor 130 can include analog and/or digital electronic circuitry, or combinations thereof. Processor 130 can also include one or more data storage devices that store logic and/or parameters for the processing of signals. Processor 130 outputs the processed sound signals to auditory system interface 135.

Auditory system interface 135 receives the processed sound signals from processor 130. Auditory system interface 135 is a device that conveys the processed sound signals as information 110 directly to the subject's auditory system 115. Information 110 is compatible with the subject's auditory system 115. In a typical human subject, auditory system 115 includes an eardrum 140, ossicles 145, cochlea 150, and auditory nerve 155, along with portions of the brain that process sound information (not shown). Auditory system interface 135 can convey information 110 directly to these or other portions of auditory system 115. For example, auditory system interface 135 can be a speaker in a hearing aid that generates sound waves of sufficient amplitude to mechanically stimulate auditory system 115. As another example, auditory system interface 135 can be an electrode array that electrically stimulates nerve cells in a portion of auditory system 115. The conveyed information 110 includes at least a portion of the information processed by processor 130.

Figure 2:
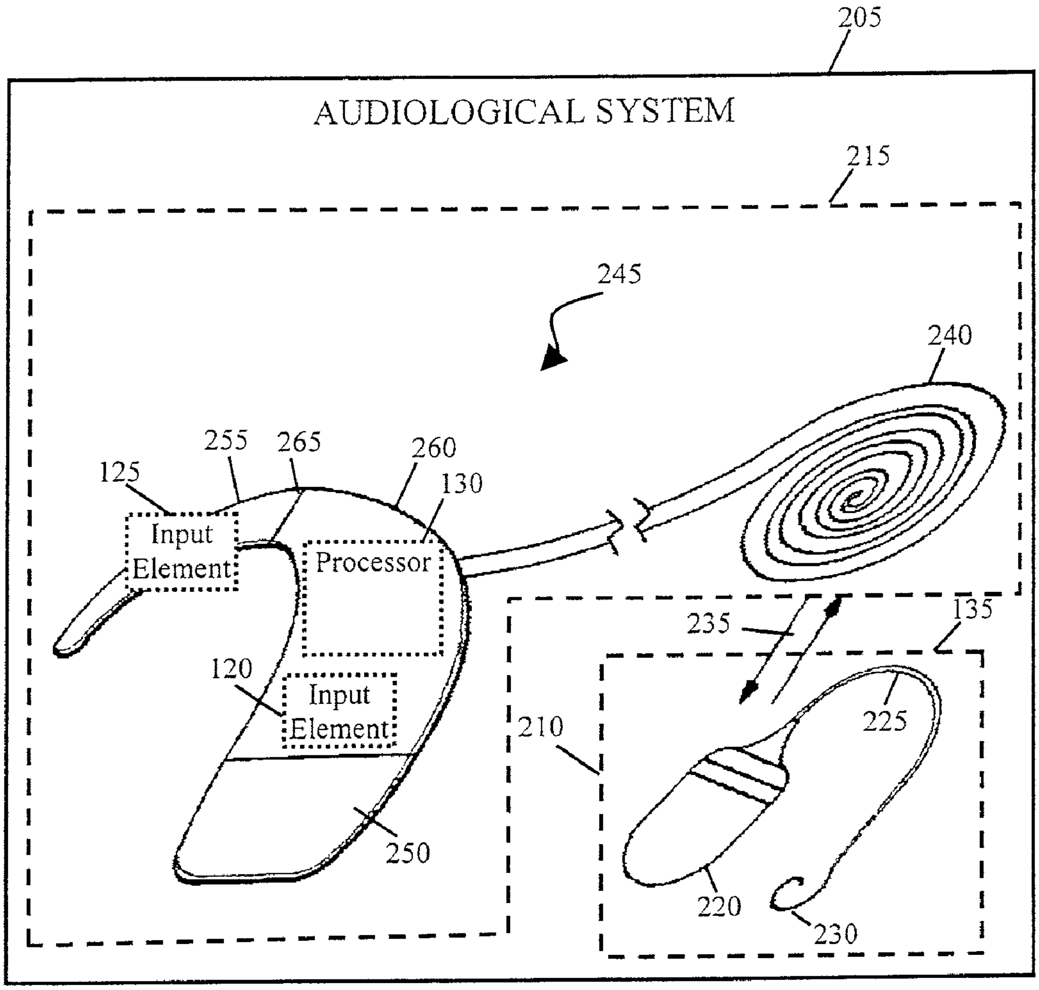
FIG. 2 shows another implementation of an audiological system that conveys sound information directly to a subject's auditory system.

FIG. 2 shows another audiological system 205 that conveys sound information 110 directly to a subject's auditory system 115. Audiological system 205 is designed to convey sound information by directly stimulating nerve cells in cochlea 150 of a subject's auditory system. Audiological system 205 can be dimensioned to be borne by a subject.

Audiological system 205 includes an implanted portion 210 and an unimplanted portion 215. Implanted portion 210 acts as interface 135 in stimulating cochlea 150 to convey information 110 to the subject. Implanted portion 210 includes a receiver 220, a lead 225, and a collection of electrode contacts 230. Receiver 220 is a device that receives power and information 235 from outside the body. For example, receiver 220 can include a metal coil sheathed in a biocompatible cover. Lead 225 conveys power and information 235 received by receiver 220 to electrode contacts 230. Electrode contacts 230 directly stimulate nerve cells in cochlea 150 in accordance with the information 235 received by receiver 220. For example, individual electrode contacts 230 can change the local electrical potential, inject current, and/or otherwise stimulate the depolarization of selected nerve cells in cochlea 150 to convey information 110 to a subject. In one implementation, implanted portion 210 can be the HiReS™ 90K Implant from Advanced Bionics Corporation (Sylmar, Calif.).

Unimplanted portion 215 includes a transmitter 240 and a behind-the-ear (BTE) unit 245. Transmitter 240 is a device for conveying power and information 235 to receiver 220 from outside the body. For example, transmitter 240 can include a metal coil sheathed in a cover.

Behind-the-ear unit 245 can be dimensioned to be mounted and supported on a subject's ear. Behind-the-ear unit 245 includes a power supply 250, an input element housing 255, and a processor housing 260. Power supply 250 can be a battery or other source of energy. Power supply 250 supplies power to the rest of behind-the-ear unit 245 and to transmitter 240 over one or more power lines (not shown).

Input element housing 255 houses input element 125. Input element 125 conveys the signal representative of sound to processor 130 over one or more signal lines. In one implementation, input element housing 255 and input element 125 can be interchangeable by a user. With an interchangeable input element 125, a user can exchange the input element housing 255 that houses input element 125 for a different input element housing 255 that houses a different input element 125. The various interchangeable input elements 125 can be different devices of the same class or different devices of different classes.

Processor housing 260 houses processor 130 and input element 120. Processor housing 260 also includes a power input from supply 250, a signal input from input element 125, and an output to transmitter 240. Divider element 265 serves as a junction between input element housing 255 and processor housing 260. In one implementation, input element 120 is a direct input device such as a pressure-sensitive microphone that transduces sound directly to generate a signal representative of sound. Processor 130 processes the signals generated by input elements 120, 125 for conveyance to the auditory system.

Figure 3:
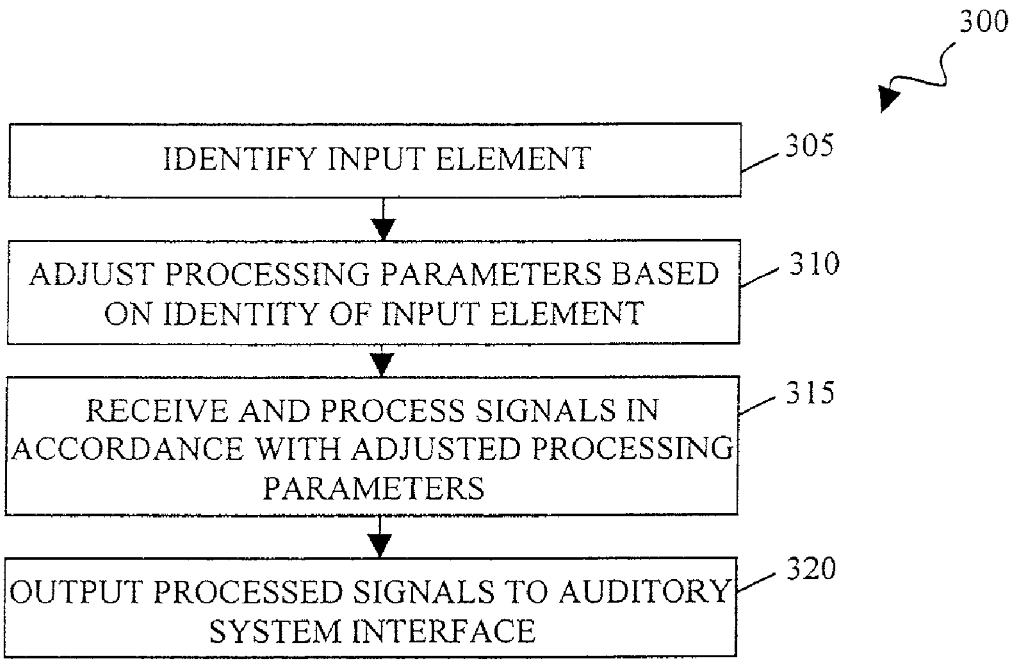
FIG. 3 is a flowchart of a process for processing signals representative of sound for conveyance directly to a subject's auditory system.

FIG. 3 is a flowchart of a process 300 for processing signals representative of sound for conveyance directly to a subject's auditory system. Process 300 can be performed by a device such as processor 130 in FIGS. 1 and 2.

The device performing process 300 identifies one or more input elements from which it is receiving signals representative of sound at 305. An input element can be identified either as a member of a class or uniquely (e.g., as an individual device). The input element identification can be performed automatically, i.e., without human intervention. The input element identification can be triggered by certain events such as, e.g., an exchange between different input elements, a power-on or reset of the audiological system, a user request, or the passage of a predetermined period of time.

An input element can be identified by relying on any of a number of different distinguishing characteristics of the input element. Examples of such distinguishing characteristics include the characteristics of the signal received from the element, the responses of the element to interrogative probing, or the characteristics of an identifying label or tag (such as a globally unique ID number) associated with the input element. In one implementation, different classes of input elements have distinguishing electrical characteristics that identify the classes. The distinguishing electrical characteristics can be inherent to the input elements or input elements can be intentionally designed to possess the distinguishing electrical characteristics. In one implementation, the electrical impedance of different classes of input elements can be designed to have certain values, e.g., by endowing different classes of input elements with distinguishing output impedances. In another implementation, the output impedance of different classes of input elements can be inherently distinguishable.

The device performing process 300 adjusts processing parameters based on the identity of the input element at 310. Processing parameters are quantities, values, or instructions that establish the processing of signals representative of sound. The processing parameters can include, e.g., the gain at which a signal from an input element is amplified, the mixing ratio between signals from two or more input elements, the dynamic range, any time or phase delay applied to a signal, the nature of the passband, and other factors that relate to the conveyance of a signal to the auditory system.

An example of such a factor that relates to the conveyance of a signal to the auditory system is a stimulating strategy. A stimulating strategy is a technique for adapting signals representative of sound for conveyance directly to the auditory system by stimulating nerves in the cochlea. A stimulating strategy can include mapping the sound information to different nerve cells in the cochlea. Such a mapping can include identifying the sound content of certain bandwidths and determining the extent to which certain nerve cells are to be stimulated based on that content. Examples of stimulating strategies are described, e.g., in U.S. Pat. No. 6,289,246 to Faltys et al., the contents of which are incorporated herein by reference.

Another example of a factor that relates to the conveyance of a signal directly to the auditory system is an amplification strategy. When sound information is conveyed to the auditory system by amplifying sound that impinges directly upon the eardrum, an amplification strategy can include identifying the sound content of certain bandwidths and determining the amplification of those bandwidths based on the frequency sensitivity of an individual subject's auditory system.

The device performing process 300 receives and processes signals representative of sound from one or more input elements in accordance with the adjusted processing parameters at 315, and outputs the processed signals to an interface with the auditory system at 320.

Figure 4:
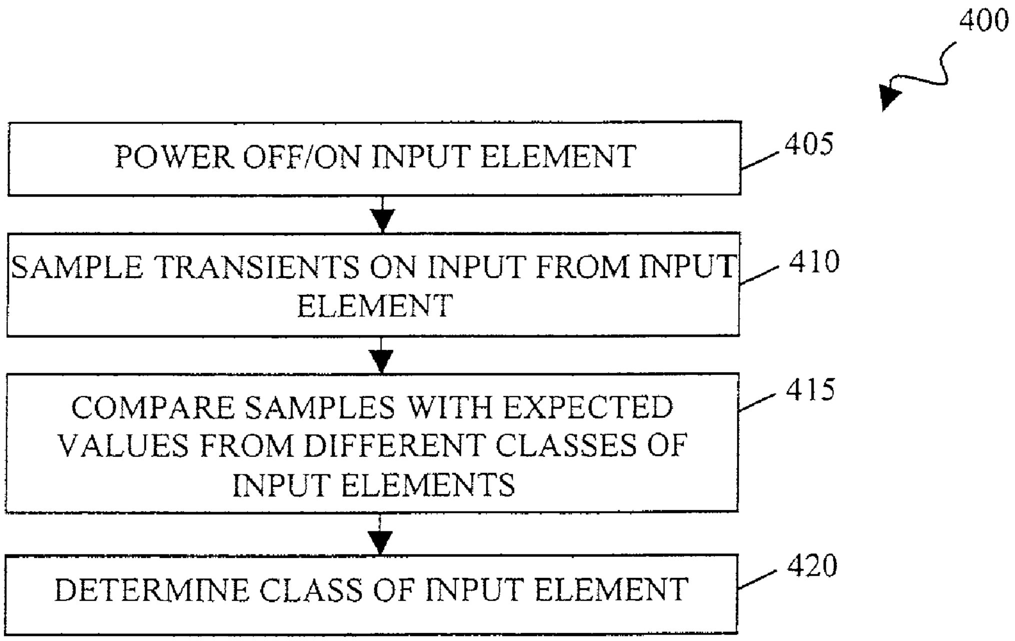
FIG. 4 is a flowchart of a process for identifying an input element that generates signals representative of sound.
Figure 5:
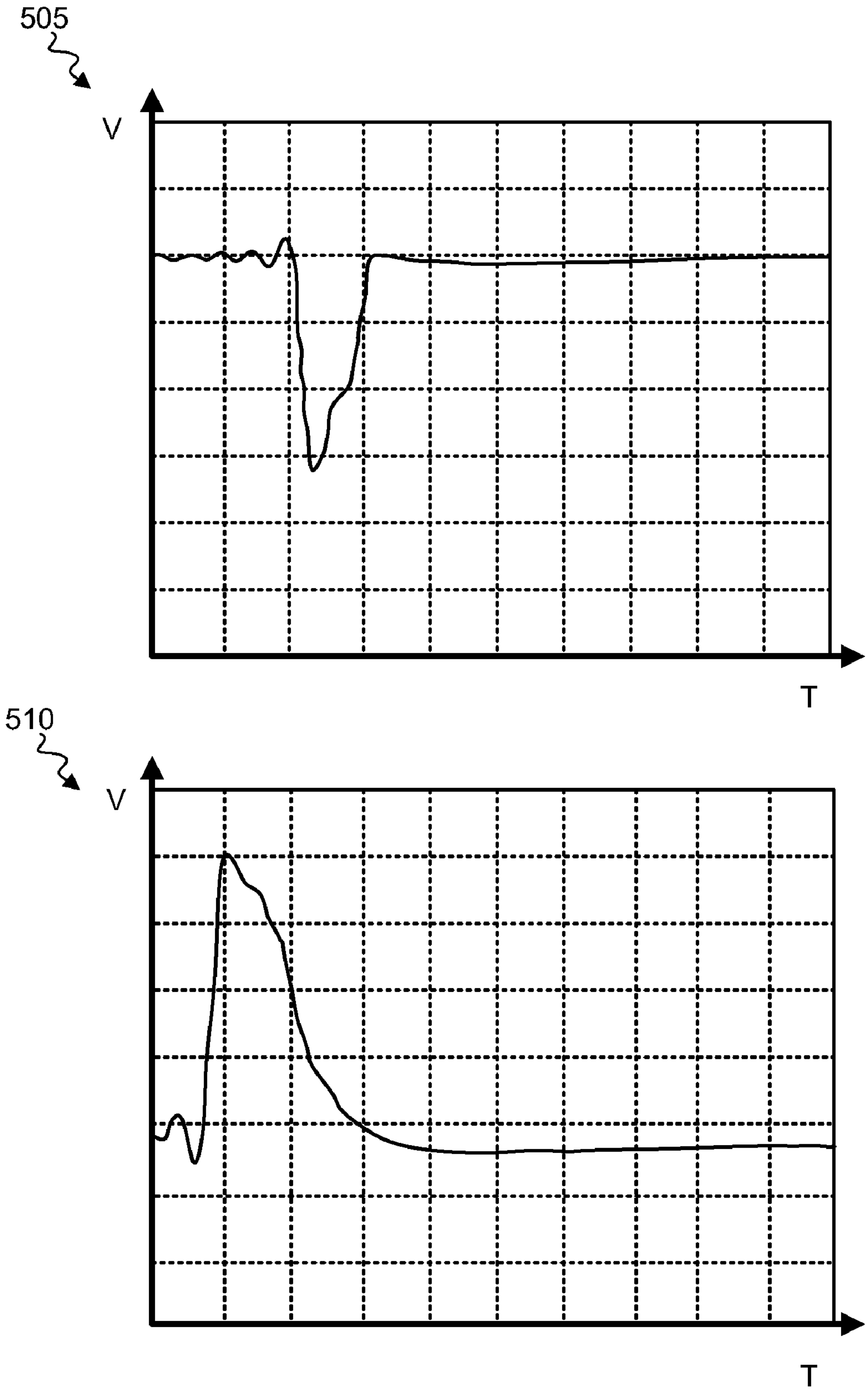
FIGS. 5-8 illustrate examples of distinguishing characteristics of different classes of input elements.

FIG. 4 is a flowchart of a process 400 for identifying an input element that generates signals representative of sound. Process 400 can be performed in isolation or process 400 can be performed as part of a larger process. For example, process 400 can be performed at 305 in process 300 (FIG. 3).

The device performing process 400 powers on and/or off an input element to be identified at 405. The device can, e.g., make or break a power feed to the input element or the device can trigger the input element to turn on and/or turn off internally. Rather than causing the powering on and/or off, the device can also identify when an input element is powered on and/or off.

The device performing process 400 samples the power-on and/or power-off transients on the input from the input element at 405. Sampling at 410 can be performed continuously or sampling at 410 can be triggered by the occurrence of a particular event, such as the crossing of a predetermined threshold on the input from the input element. The transients can be sampled directly or after processing.

FIGS. 5-8 illustrate example transients for different classes of input elements that can be sampled. In particular, FIG. 5 includes traces 505, 510. Trace 505 is a power-off transient on the output of an example audio frequency induction loop receiver, and trace 510 is a power-on transient for the output of the example audio frequency induction loop receiver.

Figure 6:
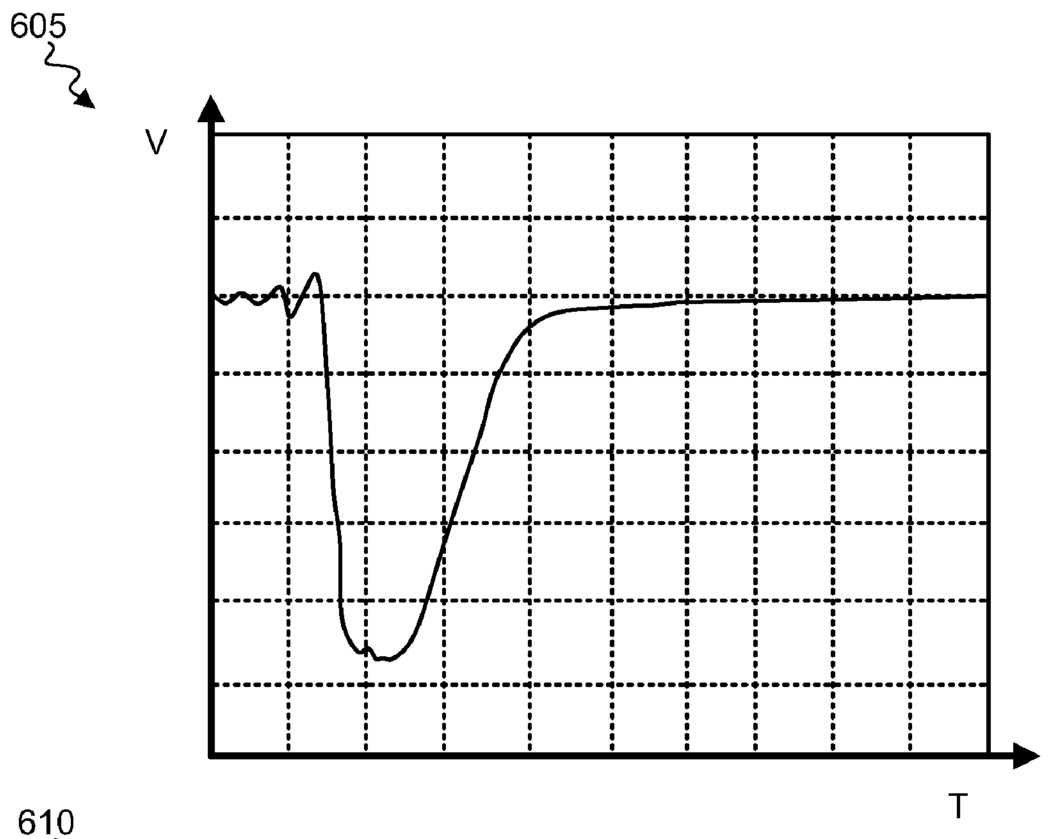
Figure 6:
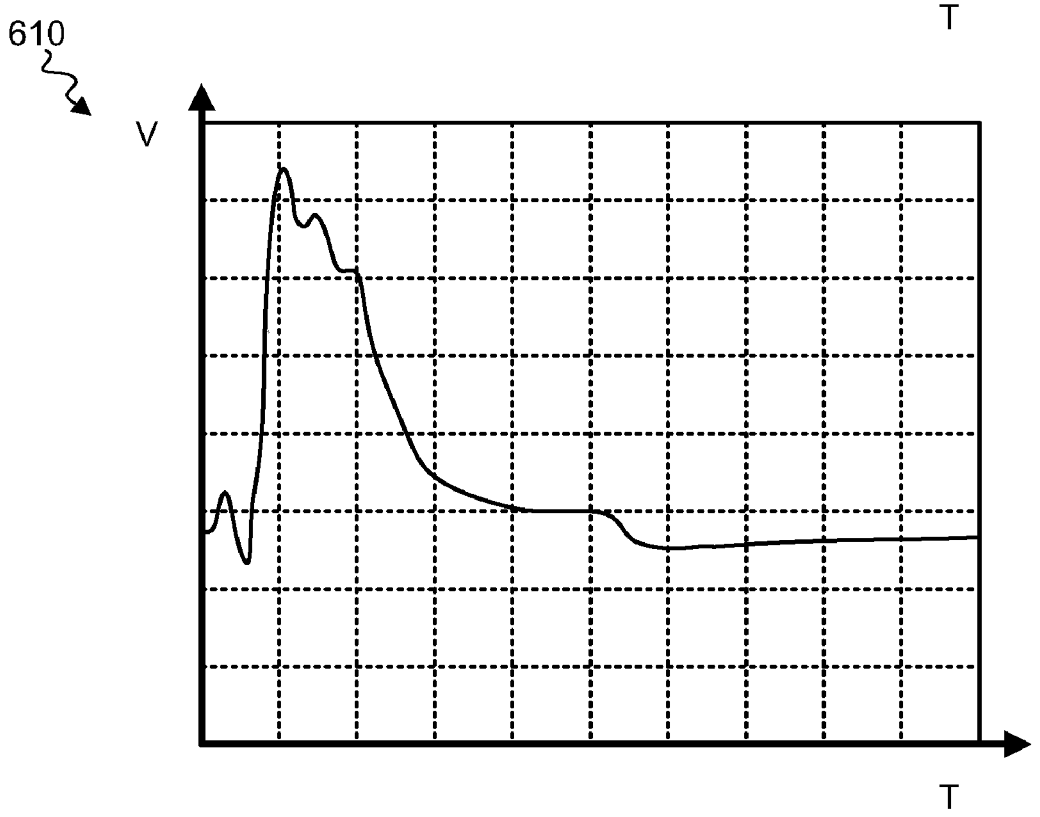

FIG. 6 includes traces 605, 610. Trace 605 is a power-off transient on the output of an example microphone system, namely the T-MIC system from Advanced Bionics Corporation (Sylmar, Calif.), and trace 610 is a power-on transient for the T-MIC system.

Figure 7:
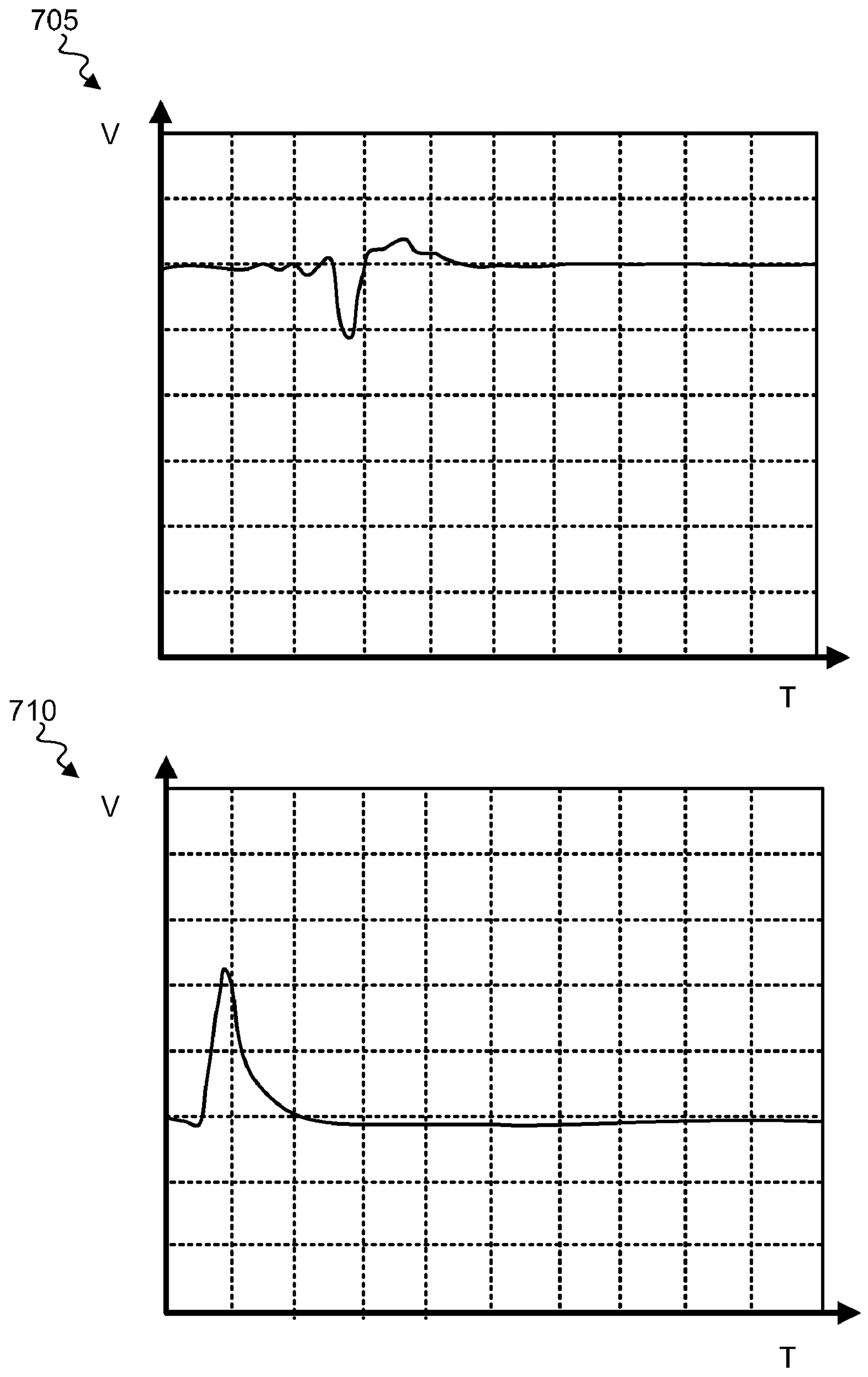

FIG. 7 includes traces 705, 710. Trace 705 is a power-off transient on the output of an example low source impedance signal generator, and trace 710 is a power-on transient for the same low source impedance signal generator. Low source impedance signal generators are devices that generally respond to something other than sound to generate a signal representative of sound. Examples of low source impedance signal generators include MP3 players, CD players, CD/MP3 players, tape players, record players, AM and FM receivers, and television and cable receivers.

Figure 8:
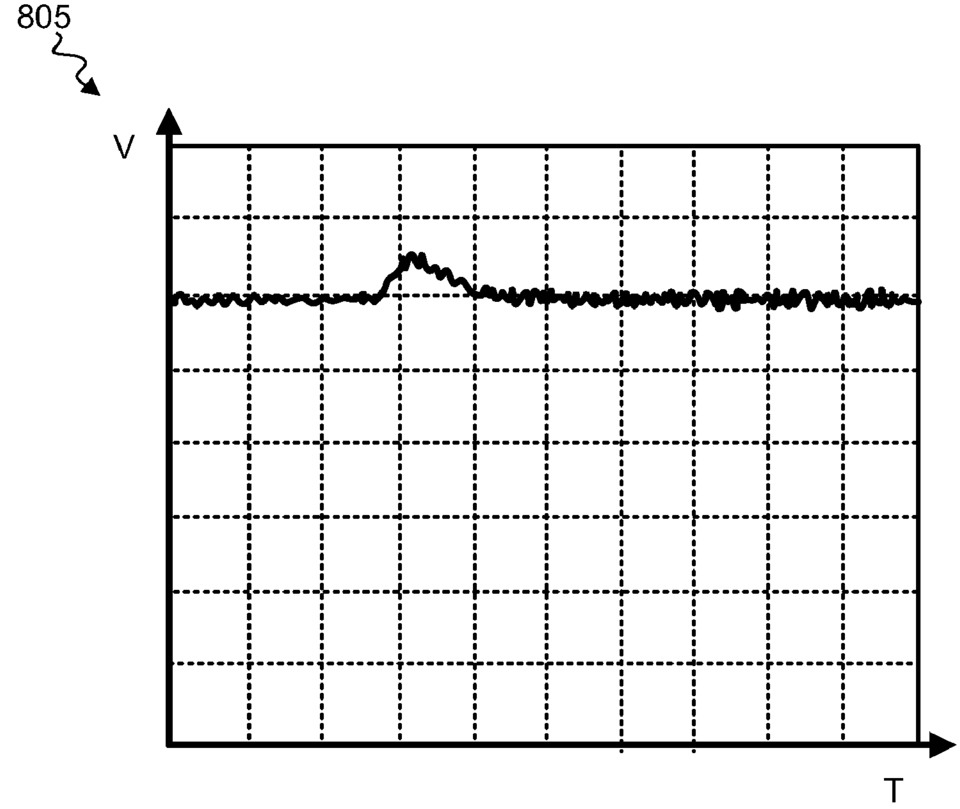
Figure 8:
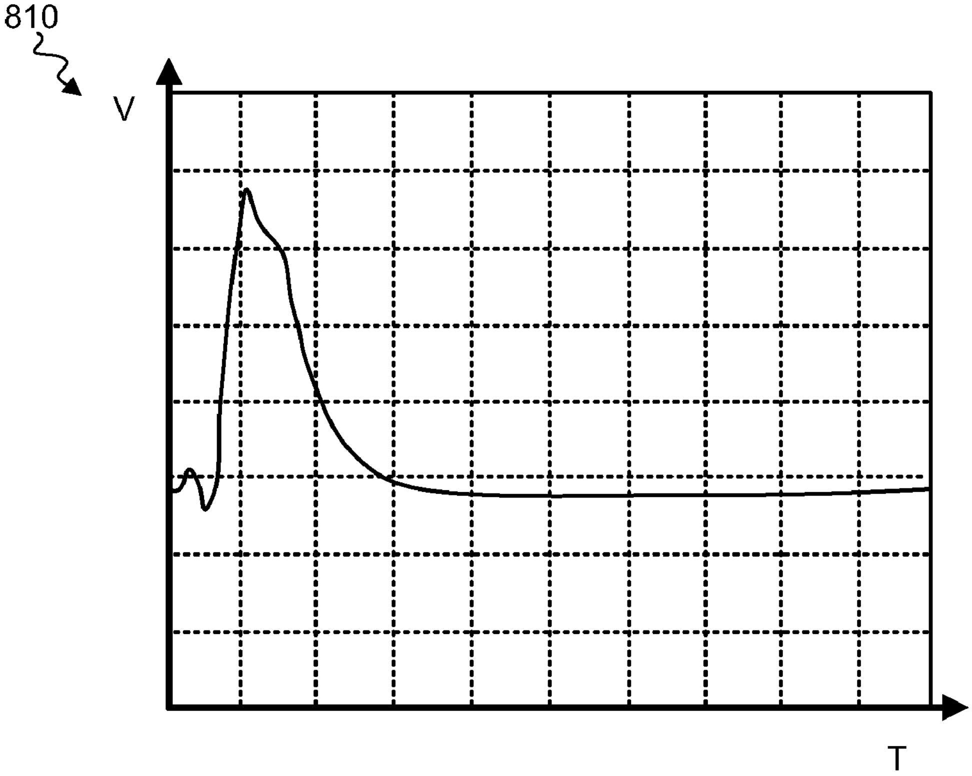

FIG. 8 includes traces 805, 810. Trace 805 is a "power-off" transient when no input element in connected to the input of a device performing process 400, and trace 810 is a "power-on" transient for when no input element in connected. In other words, traces 805, 810 reflect the open input response of the device performing process 400.

By appropriate sampling of traces 505, 510, 605, 610, 705, 710, 805, 810, the device performing process 400 can acquire distinguishing characteristics of traces 505, 510, 605, 610, 705, 710, 805, 810.

Returning to FIG. 4, the device performing process 400 compares the samples of the transients with expected values from different classes of input elements at 415. Such a comparison can be made in a number of ways, including comparing the magnitude and/or duration of a transient with predetermined average or expected values. As another example, time/value pairs at predetermined times in the power-on/-off transients can be compared with expected values stored, e.g., in a look-up table.

Based, at least in part, on the result of this comparison, the device performing process 400 determines the class of the input element at 420. The class can be determined by selecting a device class with average or expected characteristics that are most closely matched by the actual characteristics of the transients.

Figure 9:
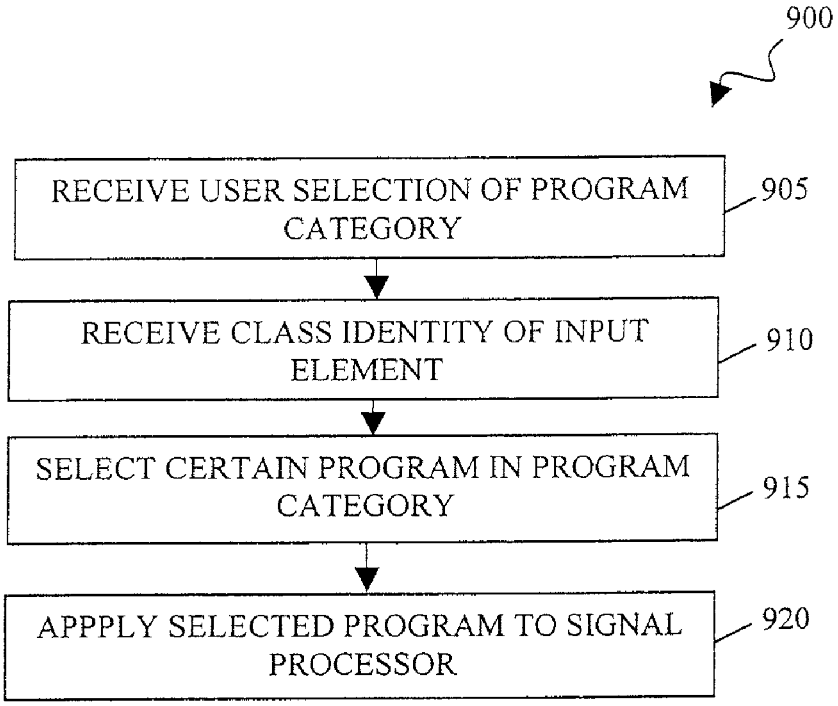
FIG. 9 is a flowchart of a process for adjusting processing parameters based on the identity of one or more input elements that generate signals representative of sound.

FIG. 9 is a flowchart of a process 900 for adjusting processing parameters based on the identity of one or more input elements that generate signals representative of sound. Process 900 can be performed in isolation or process 900 can be performed as part of a larger process. For example, process 900 can be performed at 310 in process 300 (FIG. 3).

The device performing process 900 can receive a user selection of a program category at 905. A program category is a collection of one or more programs for the processing of signals representative of sound. The collection of programs in a program category can share common characteristics that define the category. For example, the programs in a program category can all be directed to improving operation under a certain set of operating conditions. An example of such a program category is the "noise program category" which includes programs for improving operation in noisy environments.

The device performing process 900 can receive the class identity of one or more input elements at 910. The class identity of an input element is an identification of the class, or characteristics of the class, of an input element. For example, a class identity can be an indication that a particular input element is a low source impedance signal generator. As another example, a class identity can be an indication that a particular input element has a certain input impedance and bandwidth.

The device performing process 900 can, based on the received class identity of the input element and user selection of a program category, select a program within the program category at 915. A program is a predetermined association of processing parameters for the processing of signals representative of sound. The parameters in a program can be matched to improve the processing of certain types of signals, such as signals generated by a certain class of input elements. The program can be selected from a library of available programs.

Figure 10:
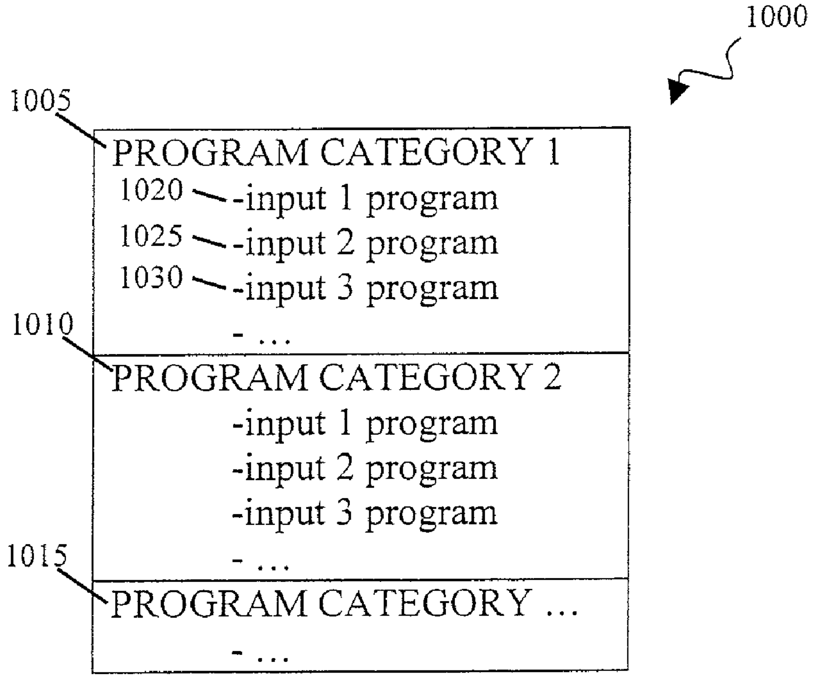
FIG. 10 shows an implementation of a program library.

FIG. 10 shows an implementation of a program library 1000 where the relationship between program categories and programs is illustrated. Library 1000 can be stored in any sort of memory device and can be implemented as any sort of data repository including a database, a data table, a linked list, or other association of records. The memory device storing library 1000 can be included in an audiological system, e.g., by storing library 1000 in behind-the-ear unit 245 or by storing library 1000 in a self-contained memory device that exchanges data with behind-the-ear unit 245 (FIG. 2).

Library 1000 includes three program categories 1005, 1010, 1015. Program categories 1005, 1010, 1015 are collections of one or more programs that share common characteristics defining the category. Program category 1005 includes programs 1020, 1025, 1030. Programs 1020, 1025, 1030 are predetermined associations of processing parameters that are coordinated to improve the processing of certain types of signals representative of sound. In particular, program 1020 is an association of instructions and parameters coordinated to improve the processing of "class 1" input elements, program 1025 is an association of instructions and parameters coordinated to improve the processing of "class 2" input elements, and program 1030 is an association of instructions and parameters coordinated to improve the processing of "class 3" input elements. Other programs are available in category 1005 and in categories 1010, 1015. Other categories may also be available.

Returning to FIG. 9, the device performing process 900 can also apply a selected program to a signal processor at 920. The application of a program to a signal processor can include an indication to the signal processor to retrieve the selected program from a library such as library 1000 (FIG. 10) or the input the processing parameters from the selected program directly to the signal processor.

A number of implementations have been described. Nevertheless, it will be understood that various modifications may be made. For example, pressure-sensitive input elements can include carbon microphones, piezoelectric microphones, crystal microphones, magnetic microphones, dynamic microphones, capacitor microphones, and/or other elements that are stimulated by sound and generate electrical or other signals. Accordingly, other implementations are within the scope of the following claims.

What is claimed is:

1. An audiological system configured to convey sound information to a user's auditory system, comprising:

a portion dimensioned to be borne by a user;

a processor;

an input to the portion configured to provide an electrical signal representative of sound to the processor, the electrical signal received by the input from an input element; and a library of programs, each program comprising processing parameters, wherein the processor is configured to automatically select a program from the library of programs based at least in part on determining the identity of the input element from an assessment of the electrical signal and to process the electrical signal in accordance with the selected program.

2. The audiological system of claim 1, wherein the programs in the library belong to different program categories.

3. The audiological system of claim 2, wherein the audiological system includes a user selection input configured to receive a user selection of a program category.

4. The audiological system of claim 1, wherein at least one of the programs comprises processing parameters for processing sound from an audio frequency induction loop receiver.

5. The audiological system of claim 1, wherein at least one of the programs comprises processing parameters for processing sound from a low source impedance signal generator.

6. The audiological system of claim 1, wherein at least one of the programs comprises processing parameters for processing sound from a direct input, pressure-sensitive element.

7. The audiological system of claim 1, wherein the electrical signal is assessed by recognizing an electrical characteristic of the electrical signal and comparing the recognized electrical characteristic to a library of expected responses.

8. The audiological system of claim 1, wherein the audiological system further comprises an implantable portion for receiving the processed electrical signal, wherein the implantable portion comprises an array configured for insertion into a cochlea of the user.

9. An audiological system configured to convey sound information to a user's auditory system, comprising:
- a portion dimensioned to be borne by a user;
- a processor;
- a plurality of inputs to the portion each configured to provide an electrical signal representative of sound to the processor, each electrical signal received by one of the plurality of inputs from one of a plurality of input elements;
- a library of programs, each program comprising processing parameters relating to a class of input elements,
- wherein the processor is configured to:
  - identify an active one of the plurality of inputs,
  - automatically select a program from the library of programs based at least in part on identifying the class of input elements from an assessment of the electrical signal from the active input, and
  - process the electrical signal from the active input in accordance with the selected program.

10. The audiological system of claim 9, wherein the programs in the library belong to different program categories.

11. The audiological system of claim 9, wherein the audiological system includes a user selection input for selecting a program category.

12. The audiological system of claim 9, wherein at least one of the programs comprises processing parameters for processing sound from an audio frequency induction loop receiver.

13. The audiological system of claim 9, wherein at least one of the programs comprises processing parameters for processing sound from a low source impedance signal generator.

14. The audiological system of claim 9, wherein at least one of the programs comprises processing parameters for processing sound from a direct input, pressure-sensitive element.

15. The audiological system of claim 9, wherein the audiological system further comprises a device configured to stimulate a user's cochlear nerve cells.

16. An audiological system configured to convey sound information to a user's auditory system, comprising:
- a portion dimensioned to be borne by a user;
- a processor;
- an input to the portion configured to provide an electrical signal representative of sound to the processor, the electrical signal received by the input from an input element;
- a library of programs, each program comprising processing parameters;
- a user selection input for receiving a user selection of a program category,
- wherein the processor is configured to:
  - select a program from the library of programs, wherein the selection of the program is based at least in part on determining the identity of the input element from an assessment of the electrical signal and the user's program category selection; and
  - process the signal representative of sound in accordance with the selected program.

17. The audiological system of claim 16, wherein at least one of the programs comprises processing parameters for processing sound from an audio frequency induction loop receiver.

18. The audiological system of claim 16, wherein at least one of the programs comprises processing parameters for processing sound from a low source impedance signal generator.

19. The audiological system of claim 16, wherein at least one of the programs comprises processing parameters for processing sound from a direct input, pressure-sensitive element.

20. The audiological system of claim 16, wherein processing the signal in accordance with the selected program comprises processing the signal for electrical stimulation of a cochlea in the user's auditory system.

21. The audiological system of claim 16, wherein the electrical signal is assessed by recognizing an electrical characteristic of the electrical signal and comparing the recognized electrical characteristic to a library of expected responses.

22. The audiological system of claim 16, wherein the program category is a collection of one or more programs that share one or more common characteristics.

* * * * *